April 26, 1938.  R. C. BLACH  2,114,990
PANTS MEASURING DEVICE
Filed April 2, 1936  2 Sheets—Sheet 1
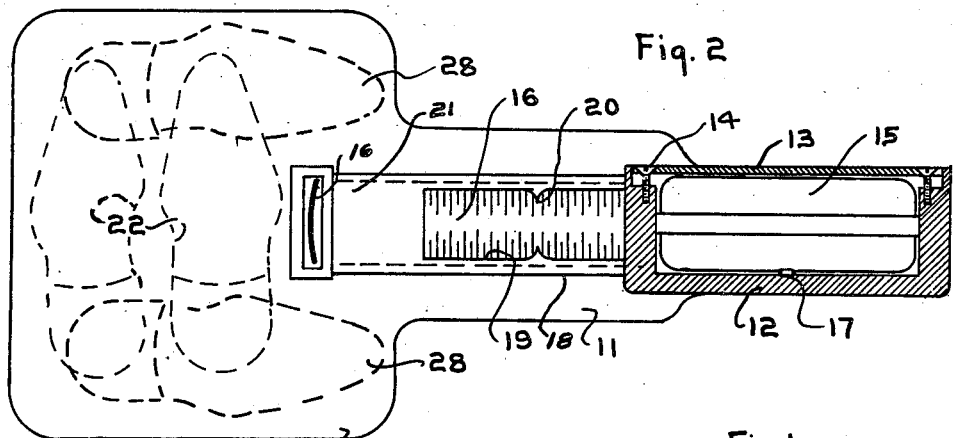
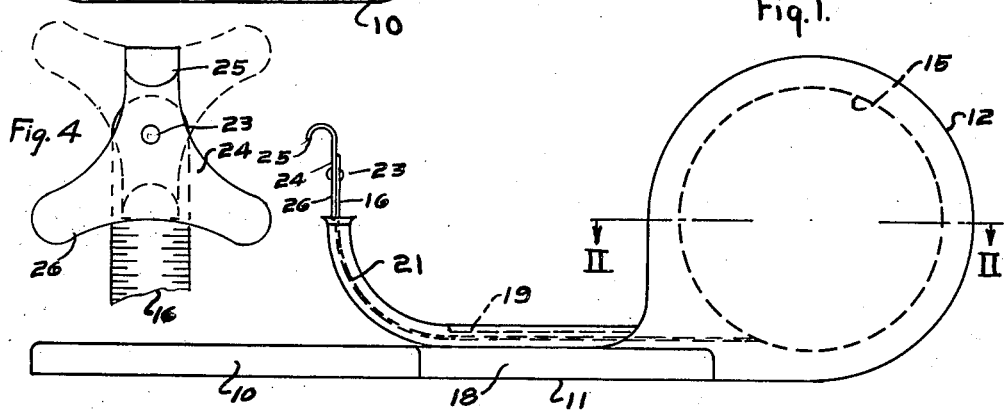
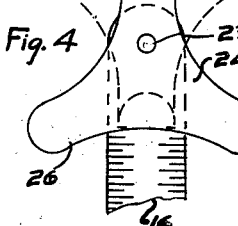
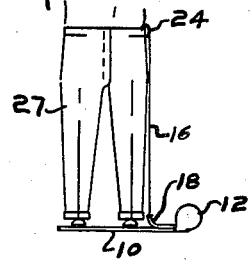
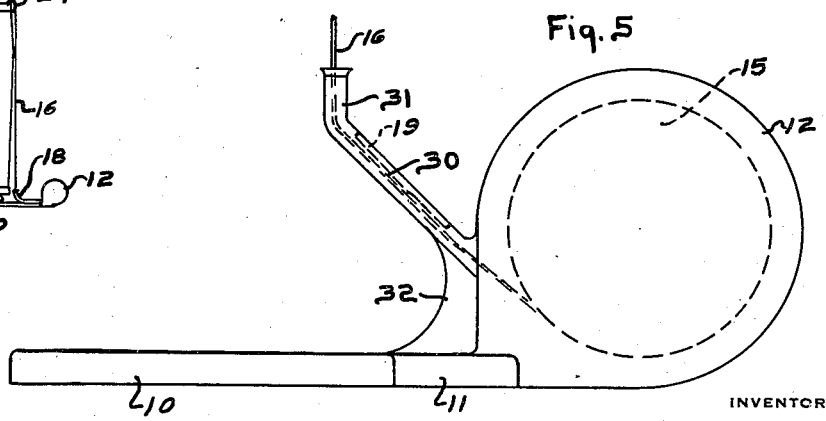
INVENTOR
Ralph C. Blach.
BY
Johnston & Jennings
ATTORNEYS April 26, 1938.  R. C. BLACH  2,114,990
PANTS MEASURING DEVICE
Filed April 2, 1936  2 Sheets-Sheet 2

INVENTOR
Ralph C. Black
BY
ATTORNEYS

Patented Apr. 26, 1938

2,114,990

UNITED STATES PATENT OFFICE 2,114,990

PANTS MEASURING DEVICE

Ralph C. Blach, Birmingham, Ala.

Application April 2, 1936, Serial No. 72,273

4 Claims. (Cl. 33—8)

My invention relates to a simple and effective means for the assistance of tailors in taking proper measures for pants.

A particular object of my invention is to provide a measuring device of this character which is readily adapted for taking both inseam and outseam measurements so that all requisite measurements for the proper cutting of the pants can be readily and quickly taken.

A further object is to devise an appliance which is comparatively inexpensive, which is capable of embodiment in both floor level and platform appliances, and which carries on the measuring element a reversible member adapted to engage over the sides of the trousers or to be received in the crotch according to the measurement being taken.

My invention further comprises the novel details of construction and arrangements of parts which are hereinafter more particularly described and claimed, reference being had to the accompanying drawings forming a part of this specification, and in which:—

Fig. 1 is a side elevation of one embodiment of my invention.

Fig. 2 is a plan view of Fig. 1.

Fig. 3 is a view illustrating the appliance taking an outseam measure.

Fig. 4 is a view showing a swivel hook and yoke attachment at the free end of the measuring tape or cord.

Fig. 5 is a view corresponding to Fig. 1 showing a modification of the invention.

Similar reference numerals refer to similar parts throughout the drawings.

Figure 6:
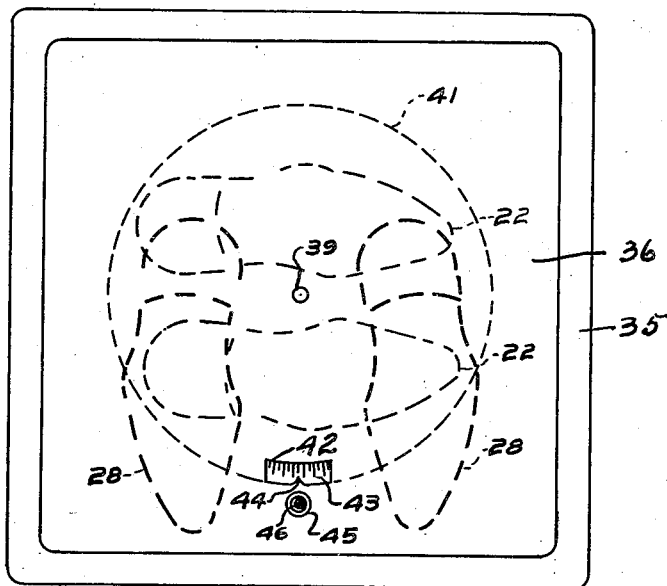
Fig. 6 is a plan view of a platform measuring appliance using a disk scale and cord, instead of the tape.
Figure 7:
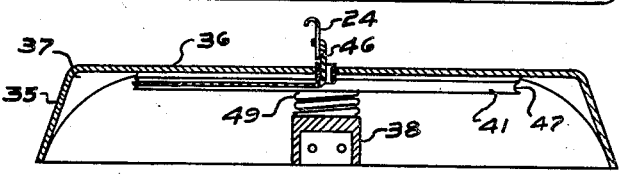
Figs. 7 and 8 are sectional views taken respectively on the lines VII—VII and VIII—VIII of Fig. 6.
Figure 8:
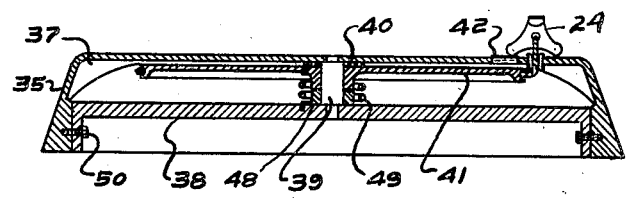
Figure 9:
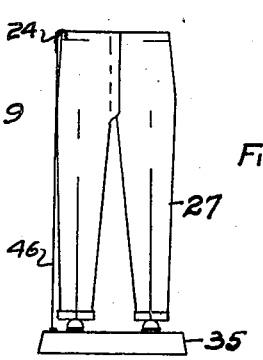
Fig. 9 is a view corresponding to Fig. 3 showing the platform appliance in service.

Referring to the embodiment of my invention illustrated in Figs. 1 to 4, I show a base of cast metal or pressed sheet metal or any other desired material, which comprises a low platform 10 upon which the customer stands to be measured, which base carries at one side an extension 11 which carries integral or fast at its outer end an annular casing 12 having a side door or panel 13 normally held in place to close the chamber by screws 14.

The chamber is shaped to receive with a snug fit the barrel 15 of a steel or other tape 16, the barrel being of the spring retracting type having a spring controlling plunger 17 which is adapted to be retracted by the pressure of the closure 13 against the barrel 15 so that the spring tension is maintained on the tape and the barrel is clamped in position. A guide 18 for the tape, either integral with or suitably attached to the base extension 11, receives the tape from the barrel 15 tangentially at the upper level of the base and conducts it past a sight opening 19 having on its sides, which overhang the marginal edges of the tape, measuring pointers 20 which overhang the scale graduations on the tape. The sight opening 19 is sufficiently long to insure the exposure of one or more of the inch measurement marks. Beyond the sight opening the guide 18 is curved upwardly at 21 through a 90° angle so as to deliver the tape 16 in position to take the outseam measurements vertically when the customer stands in the position indicated by the dotted foot marks 22. It is contemplated that a steel tape be used, slightly convex or flat and I pivotally secure to its upper end, by a rivet 23, a swivel plate 24 having a hook 25 and opposite the latter a crotch measuring tape may be employed.

By reference to Fig. 4 it will be seen that the pivot 23 for the plate 24 stands about equidistant from the hook and yoke, the distance it is spaced being made equal to the distance by which the length of the tape from the measuring pointer 20 to the upper edge of the portion 21 exceeds the vertical distance from said upper end 21 to the correct level for the bottom of the trousers to hang above the platform 10. When the hook 25 therefore is engaged over the side of the trousers 27 and line with the outseam the pointer will indicate on the tape the exact measurement for the outseam of the trousers. The customer by reversing his position can check both outseams to correct any malformation. To take the inseam measure, the customer faces the device with his feet in the position of the dotted foot marks 28 and the hook is swung down on the tape and the yoke 26 is swung up and moved to correct position in the crotch, whereupon the pointers 20 will indicate the correct length for the inseam. Tension being maintained on the spring barrel 15, when the tape is released it will be retracted until its swivel plate 24 engages the guide 21 as a stop, see Fig. 1.

In Fig. 5 I show a similar arrangement of parts, except that the guide 30, corresponding to 18, rides at an angle of 45° to the base and terminates in a short, angled, delivery neck 31, there being a suitable web or brace 32 to support the neck 30. The sight opening 19 and pointers 20 will be provided in the upper inclined face of the guide 30 just as they are provided in the guide 18. The extension 11 will be somewhat shortened in this design due to the shape and position of the guide 30 as compared with the guide 18.

In Figs. 6 to 9 I show my invention as applied to a platform type of measuring appliance, the platform comprising the marginal sides 35 and a top 36, the latter being braced by internal webs or ribs 37 and also by a rigid cross bearing support 38 having in its center the reduced end of a bearing stud 39, the upper reduced end of which fits through a washer 40 into a socket or aperture in the center of the platform which is thus braced by the shoulder on the bearing stud. A disk pulley 41 moves in close relation to the underface of the top 36 of the platform which is made as thin as consistent with the required strength and which has an arcuate sight opening 42 subtending several inches of the periphery of the pulley disk 41. This exposed face of the pulley disk is provided with an annular scale 43 imprinted or applied thereto in any suitable manner and is provided with a pointer 44 opposite a thimble 45 set in the top and through which a tape or cord 46 passes into engagement with the peripheral groove 47 of the pulley disk and passes around same one or more times as may be desired. The cord is made fast to the swivelled plate 24, already described, and to the pulley disk. The scale on the dial is set so that when the plate 24 has its yoke 26 presented in the crotch or its hook 25 engaged over the side of the trousers, the pointer 44 will stand opposite the correct inseam or outseam measure on the disk. The measurements are taken as already described, the customer standing according to the foot prints 22, as shown in Fig. 6 or in reverse position for the outseam, and in the position according to the foot prints 28 for the inseam measure.

The pulley has a hub which turns freely about the pin 39, being supported on a collar 48 and a coil spring 49 with its ends made fast to the disk 41 and cross support 38 will return the dial to initial position with its swivel plate 24 in engagement with the thimble 45. Screws 50 mount the bearing support 38 demountably in position in the platform.

Figure 10:
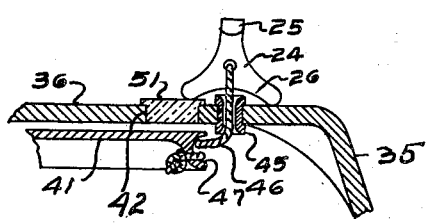
Fig. 10 is a detail sectional view enlarged through part of the platform, showing the sight opening and the thimble for the cord.

All three forms of my invention are susceptible of embodiment in relatively light and inexpensive forms, using any desired type of tape and affording an accurate and convenient means by which a tailor can quickly take both outseam measurements and the inseam measurement for the cutting or finishing of pants. To make the measurements on the tape more readily visible in the several embodiments of my invention a magnifying glass 51, see Fig. 10, may be used and also illuminating means may be provided, but as such latter means forms no particular part of my present invention, I have not illustrated same.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a tailor's measure for trousers, a flexible measuring element, spring means for retracting said element, means to expose a scale opposite a measuring point, which scale moves responsive to said flexible measuring element, and a swivel plate at the free end of the measuring element having inseam and outseam measuring edges equi-distant from its swivel.

2. A device of the character described in claim 1, in which the swivel plate comprises a hook forming the outseam measuring edge, and a yoke forming the inseam measuring edge.

3. A measuring device for trouser seams comprising a platform base, a spring retracted tape, a housing therefor, a guide to conduct the tape first laterally and then vertically, the guide being placed in position for measuring the trouser inseam and both outseams of a person standing on the platform base, and a sight opening adjacent said housing provided with a pointer adapted to indicate by reference to the tape scale the correct length for the seam to the upper end of which the free end of the tape is presented.

4. In a tailor's measure for taking outseam and inseam trouser measurements, a spring retracted flexible measuring tape, a mounting for said tape disposed so a person may stand thereby for all said seam measurements, and a top element on the tape carrying a hook for the outseam and a crotch engaging element for the inseam measures.

RALPH C. BLACH.